Oct. 15, 1929.    O. VON BRONK    1,731,992
INDOOR AERIAL
Filed Oct. 28, 1924
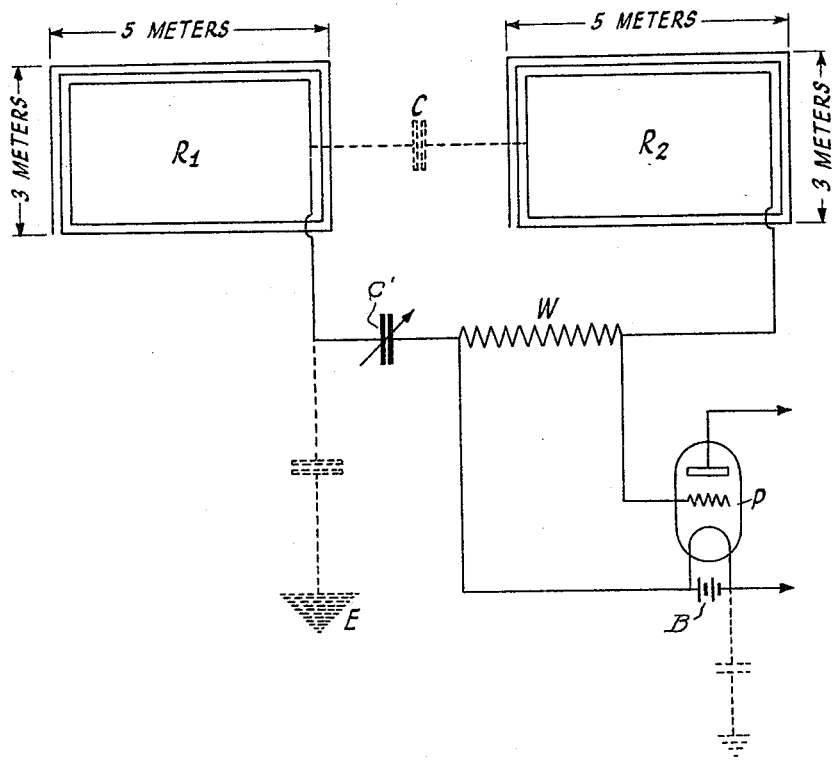
INVENTOR
OTTO VON BRONK
BY *[signature]*
ATTORNEY Patented Oct. 15, 1929

1,731,992

UNITED STATES PATENT OFFICE

OTTO von BRONK, OF BERLIN, GERMANY, ASSIGNOR TO GESELLSCHAFT FÜR DRAHTLOSE TELEGRAPHIE M. B. H., OF BERLIN, GERMANY, A CORPORATION OF GERMANY

INDOOR AERIAL

Application filed October 28, 1924, Serial No. 746,263, and in Germany November 17, 1923.

My invention relates to a method and means for wireless communication using one or more loop aerials arranged in a novel manner and has for its object to provide such an arrangement that is very efficient and well adapted for use indoors.

Other objects will be apparent from the following description and claims when considered with the accompanying drawing in which the single figure is a circuit illustrating principle of my invention.

Up till now either open aerials or coil aerials were used for receiving electro-magnetic oscillations. It has been found that a frame aerial at the same time acts as a condenser aerial on account of its capacity to earth. This quality of a frame aerial acting as a condenser aerial at the same time, is utilized for one-sided directional receiving in such a way that the frame aerial effect as well as the aerial effect are led to the receiving circuit through separate ways, whereby a one-sided receiving characteristic of the arrangement is attained.

If the receiving frame aerial or any coils of an arrangement show an asymmetrical distribution of capacity to earth with regard to the receiving apparatus, capacity-currents flow through different parts of the arrangement, from one conductor to another or from the arrangement to earth. These capacity currents generate additional voltage differences across the alternating current resistances of the circuit. In practice, for instance, for measuring purposes, these additional currents must be compensated by adding capacities in such a way that they cannot spoil the results of the measurements or be the cause of wrong pointing in case of directional receiving.

If small energies are to be received and if the directional effect is not to be taken into consideration, it is necessary to lead voltages or currents as high as possible to the receiver (vacuum tube, detector).

The present invention relates to a receiving aerial of comparatively small dimensions such as can for instance be used indoors for the reception of so-called radio telephone broadcasting.

According to the invention not only the frame aerial effect, as usual up till now, but also the simple or condenser aerial effect, is to be led to the grid of a tube. These two effects are not led across different ways to the receiver, but that branch of the circuit which contains the frame aerial or the frame aerials, is at the same time traversed by the two currents generated by the frame aerial effect and the simple aerial effect, and from this branch the energy is transferred to the receiver.

One embodiment of the invention consists therein that two large wire loops or coils are used. One end of each is left open and the remaining ends are connected to one another and to the indicator of the receiver across an inductance coil, a capacity or a resistance. This circuit consisting of the two wire loops and the alternating current resistance is closed across the mutual capacity of both wire loops or across the capacities of these loops with regard to earth and is consequently traversed by a current generated by the frame effect of the two coils.

In order that this current be as great as possible, it must be observed that the sense of winding of the two loops is such that the electromotive forces generated by the incoming wave in the two frame aerials act in the same sense. A voltage originating from the frame effect is thus generated across the alternating current resistance and can for instance be led to the grid of a vacuum tube. At the same time this closed circuit taken as a whole acts as a condenser aerial because of its capacity to earth and therefore it is traversed by a current generated by the simple aerial effect. This current branches on the one hand across the alternating current resistance which connects the two wire loops and on the other hand across the capacities between the two coils or between coils and earth. This current originating from the simple aerial effect also produces a voltage drop across the alternating current resistance which is added as a vector to the voltage drop generated by the frame current.

By suitably dimensioning the inductances and capacities the frame current and condenser aerial current are added together in their effects and thus a very high voltage drop across the alternating current resistance connecting the two coils of the above described embodiment is obtained.

Referring to the drawing, $R_1$ and $R_2$ are the two frame aerials connected by the alternating current resistance W. This resistance W is connected to the grid and the cathode of thermionic tube P which may be the first tube of a radio frequency amplifier or of an audion receiver. The condenser C represented by dotted lines denotes the mutual capacity of the two frame aerials $R_1$ and $R_2$, or the capacitive connection of both frames to earth. This circuit attached to the grid of the tube is connected to earth either directly as for example at point E or across the capacity of the usual filament heating battery B. $R_1$, R, $R_2$ and W form the closed circuit for the frame aerial reception and at the same time this circuit together with the earth connection E is the condenser aerial in which the aerial current branches across capacity C and resistance W.

In order that the frame current may be a maximum, it is appropriate to tune this closed circuit by means of a condenser $C_1$ for example to the wave which is to be received. The alternating current resistance W must be low in comparison with the capacitive impedance represented by capacity C, so that the greatest part of the capacity current generated by the aerial effect flows through resistance W. Therefore, the two ends of the frame coils may not be connected to one another because such a connection would create a direct electrical circuit of practically no resistance which substantially would carry the entire current and thereby leave no capacity current flowing through impedance W.

Consequently two conditions must be considered for the optimum effect, on the one hand the syntonization of the closed circuit $R_1$, $C_1$, W, $R_2$, C in order to attain a maximum frame aerial effect, and on the other hand such a dimensioning and arranging of the frame aerials that the connecting capacity is small, so that the capacity current of the simple aerial effect principally flows through the alternating current resistance W. It must of course be observed that the circuit is tuned and dimensioned in such a way that frame aerial current and capacity current flowing through resistance W have as nearly as possible the same phase.

It has been found that the above described arrangement considerably surpasses the former usual loop aerials or frame aerials, particularly if the natural oscillation of this closed circuit $R_1$, $C_1$, W, $R_2$, C is equal to the incoming wave or at least equal to a quarter of the receiving wave length.

If the frame aerial $R_2$ of the schematic connection according to the figure is omitted, similar effects are obtained in principle. In this case the circuit $R_1$, $C_1$, W is directly closed by means of the capacity of frame aerial $R_1$ to earth and the capacity at the filament through battery B to earth. The use of two frame aerials, the planes of which are different by 90° has the advantage that a maximum reception can be attained from two directions different by 90° by utilizing either the one or the other of the two immovably arranged frame aerials. If both frame aerials are simultaneously used, a maximum reception is obtained from a diagonal direction.

The usual existing disadvantages of present day amateur reception are eliminated by the above described indoor aerial. These disadvantages were the difficulties of erecting a high aerial and of protecting the house against atmospheric discharges on the one hand, and on the other it was often impossible to obtain the permission of the landlord for putting up a high aerial. Besides open earthed aerials have the disadvantage that atmospherics, electric trams, lighting leads or such, cause disturbances of the reception where by a natural reproduction of music and speech is influenced in the highest degree. The frame aerial reception does not show these mentioned disadvantages, but the receiving effect is smaller than that of open earthed aerials even if comparatively large frame areas are used, so that a considerable amplification is required by which new disturbances are caused.

All these disadvantages are avoided, as experiments have shown, by the use of an aerial according to the present invention, which does not require a special earthing. It is of advantage to hang up the two frame coils on two walls rectangular to one another, and is appropriate to use the walls of two different rooms. It is, however, also possible to use one single wall and the windings of the two aerials may even be wound on one another.

In case of short wave lengths an aerial according to the present invention is not only suited for receiving but also for transmitting.

Having described several embodiments of my invention I am entitled to all modifications thereof that fairly fall within the scope of the following claims:

1. In an antenna system, the combination of a plurality of spaced capacity coupled open-ended coils, means for connecting the end of one of said coils to the end of another of said coils including an alternating current resistance, and a detector the input circuit of which is connected across said resistance.

2. In an antenna system, the combination of a plurality of spaced open-ended loop aerials located in different planes, means for connecting said loop aerials including an alternating current resistance element and a condenser, and indicating means connected across said alternating current resistance.

3. In an antenna system, the combination of a plurality of open-ended frame aerials located in different planes and adapted to be capacitively coupled for loop aerial effect, means for tuning said aerials, and means for connecting said aerials including an alternating current resistance element of such a value that the natural period of said system is at least equal to one-fourth of the period of oscillation of the waves to be received, and indicating means connected across said alternating current resistance.

4. In an antenna system, the combination of a plurality of open frame aerials located in different planes and adapted to be capacity coupled for loop aerial effect, means for connecting said aerials including a tuning condenser and an alternating current resistance of such values that the loop aerial effect of said system and the condenser aerial effect of said system are in phase in said alternating current resistance, and an indicator actuated by the potential difference across said resistance.

5. In an antenna system, the combination of a plurality of spaced open-ended aerials adapted to be coupled for loop aerial effect, means for connecting the end of one of said aerials to the end of another of said aerials including an alternating current resistance, said aerials and connecting means including the alternating current resistance being of such a value that the loop aerial effect of said system is in phase with and additive to the condenser aerial effect of said system, and an indicator device associated with said alternating current resistance.

6. In an antenna system a plurality of open-ended frame windings, a condenser connected to the end of one of said frame windings, an alternating current resistance connected at one end to the end of another of said frame windings and at the other end to said condenser, said windings, condenser and alternating current resistance being of such a value that the current set up in said system due to simple aerial effect is in phase with the current set up in said system due to frame aerial effect, and a vacuum tube the input circuit of which is controlled by the potential difference across said alternating current resistance.

7. In a receiving system the combination of a pair of open-ended capacity coupled aerials, means for completing a frame aerial circuit and a vertical aerial circuit through said open-ended capacity coupled aerials including an alternating current resistance connecting the end of one of said capacity coupled aerials to the end of the other of said capacity coupled aerials, and receiving means connected across said alternating current resistance.

OTTO von BRONK.

CERTIFICATE OF CORRECTION.

Patent No. 1,731,992. Granted October 15, 1929, to

OTTO von BRONK.

It is hereby certified that error appears in the printed specification of the above numbered patent requiring correction as follows: Page 2, line 20, for the letter "R" read "C"; and that the said Letters Patent should be read with this correction therein that the same may conform to the record of the case in the Patent Office.

Signed and sealed this 11th day of March, A. D. 1930.

(Seal)

M. J. Moore,
Acting Commissioner of Patents.